(12) United States Patent
McAuley

(10) Patent No.: US 11,830,247 B2
(45) Date of Patent: Nov. 28, 2023

(54) IDENTIFYING ANTENNA COMMUNICATION ISSUES USING UNMANNED AERIAL VEHICLES

(71) Applicant: DISH Network L.L.C., Englewood, CO (US)

(72) Inventor: Andrew McAuley, Lone Tree, CO (US)

(73) Assignee: DISH Network L.L.C., Englewood, CO (US)

( * ) Notice: Subject to any disclaimer, the term of this patent is extended or adjusted under 35 U.S.C. 154(b) by 130 days.

(21) Appl. No.: 17/479,355

(22) Filed: Sep. 20, 2021

(65) Prior Publication Data

US 2023/0088658 A1 Mar. 23, 2023

(51) Int. Cl.
| | |
|---|---|
| *G06V 20/10* | (2022.01) |
| *H04W 24/04* | (2009.01) |
| *H04W 4/029* | (2018.01) |
| *G05D 1/00* | (2006.01) |
| *H04W 4/12* | (2009.01) |
| *H04B 17/23* | (2015.01) |
| *H04N 7/18* | (2006.01) |

(52) U.S. Cl.
CPC ......... *G06V 20/176* (2022.01); *G05D 1/0011* (2013.01); *G05D 1/0094* (2013.01); *H04B 17/23* (2015.01); *H04N 7/185* (2013.01); *H04W 4/029* (2018.02); *H04W 4/12* (2013.01); *H04W 24/04* (2013.01)

(58) Field of Classification Search
CPC ..... G06V 20/176; H04B 17/23; H04W 4/029; H04W 4/12; H04W 24/04; G05D 1/0011; G05D 1/0094; H04N 7/185

USPC .......................................................... 348/144
See application file for complete search history.

(56) References Cited

U.S. PATENT DOCUMENTS

| | | | |
|---|---|---|---|
| 2018/0292844 A1* | 10/2018 | Kosseifi | G05D 1/0094 |
| 2018/0321356 A1* | 11/2018 | Kulkarni | H04W 64/003 |
| 2019/0322367 A1* | 10/2019 | El Idrissi | H04L 67/125 |
| 2020/0234600 A1* | 7/2020 | Priest | G06V 20/10 |
| 2021/0150096 A1* | 5/2021 | Priest | B64C 39/024 |
| 2021/0160719 A1* | 5/2021 | Winter | G06N 3/04 |
| 2021/0173414 A1* | 6/2021 | Starr | G08G 5/045 |

\* cited by examiner

*Primary Examiner* — Frantz B Jean
(74) *Attorney, Agent, or Firm* — Jeremiah J. Baunach; VLP Law Group LLP

(57) ABSTRACT

An unmanned aerial vehicle (UAV) is dispatched to automatically fly to a location of an antenna indicated by GPS coordinates, automatically recognize the antenna at that location using automated image analysis and object detection, and then start capturing still or video imagery of the antenna in response to the recognition of the antenna. The UAV may be automatically activated to start looking for debris, obstructions or other objects affecting line-of-sight signal reception by the antenna in response to arriving at the location of the antenna and/or detection of the antenna. The UAV may automatically transmit (e.g., in real time) the still or video aerial imagery of the antenna to a backend system for analysis to determine whether there exists a specific issue (e.g., snow or other debris on the antenna) affecting wireless communication involving the antenna.

20 Claims, 7 Drawing Sheets ated object detection analysis on aerial imagery received from a UAV, according to various aspects of the present disclosure.

IDENTIFYING ANTENNA COMMUNICATION ISSUES USING UNMANNED AERIAL VEHICLES

TECHNICAL FIELD

The present embodiments relate to systems and methods for identifying antenna communication issues. In particular, the present embodiments relate to improvements in the functionality of devices and systems of technology that identifies antenna communication issues.

SUMMARY

The various embodiments of the present systems and methods for identifying antenna communication issues using unmanned aerial vehicles (UAVs), no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In an example embodiment, customer service support centers of satellite service providers may receive calls, alerts or other messages regarding communication issues (e.g., signal loss) at satellite antennas at customer premises. In order to more efficiently and conveniently determine what may be causing the issue, a system for identifying antenna communication issues may dispatch a UAV to automatically fly to a location of the antenna indicated by global positioning system (GPS) coordinates (e.g., which may also be assisted by using robotic computer vision navigation), automatically recognize the antenna at that location using automated image analysis and object detection, and then start capturing still or video imagery of the antenna in response to the recognition of the antenna.

The UAV may be automatically activated to start looking for debris, obstructions or other objects affecting line-of-sight signal reception by the antenna in response to arriving at the location of the antenna and/or detection of the antenna. The UAV may automatically transmit (e.g., in real time) the still or video aerial imagery of the antenna to a backend system for analysis to determine there exists a specific issue (e.g., snow or other debris on the antenna) affecting wireless communication involving the antenna and then automatically return to the UAV station after transmitting the still or video aerial imagery of the at least one antenna. In some embodiments, the UAV may itself perform the analysis to determine there exists a specific issue affecting wireless communication involving the antenna

BRIEF DESCRIPTION OF THE DRAWINGS

Various embodiments will be discussed in detail with an emphasis on highlighting the advantageous features. These embodiments depict the novel and non-obvious systems and methods for identifying antenna communication issues shown in the accompanying drawings, which are for illustrative purposes only. These drawings include the following figures, in which like numerals indicate like parts.

DETAILED DESCRIPTION

Figure 1:
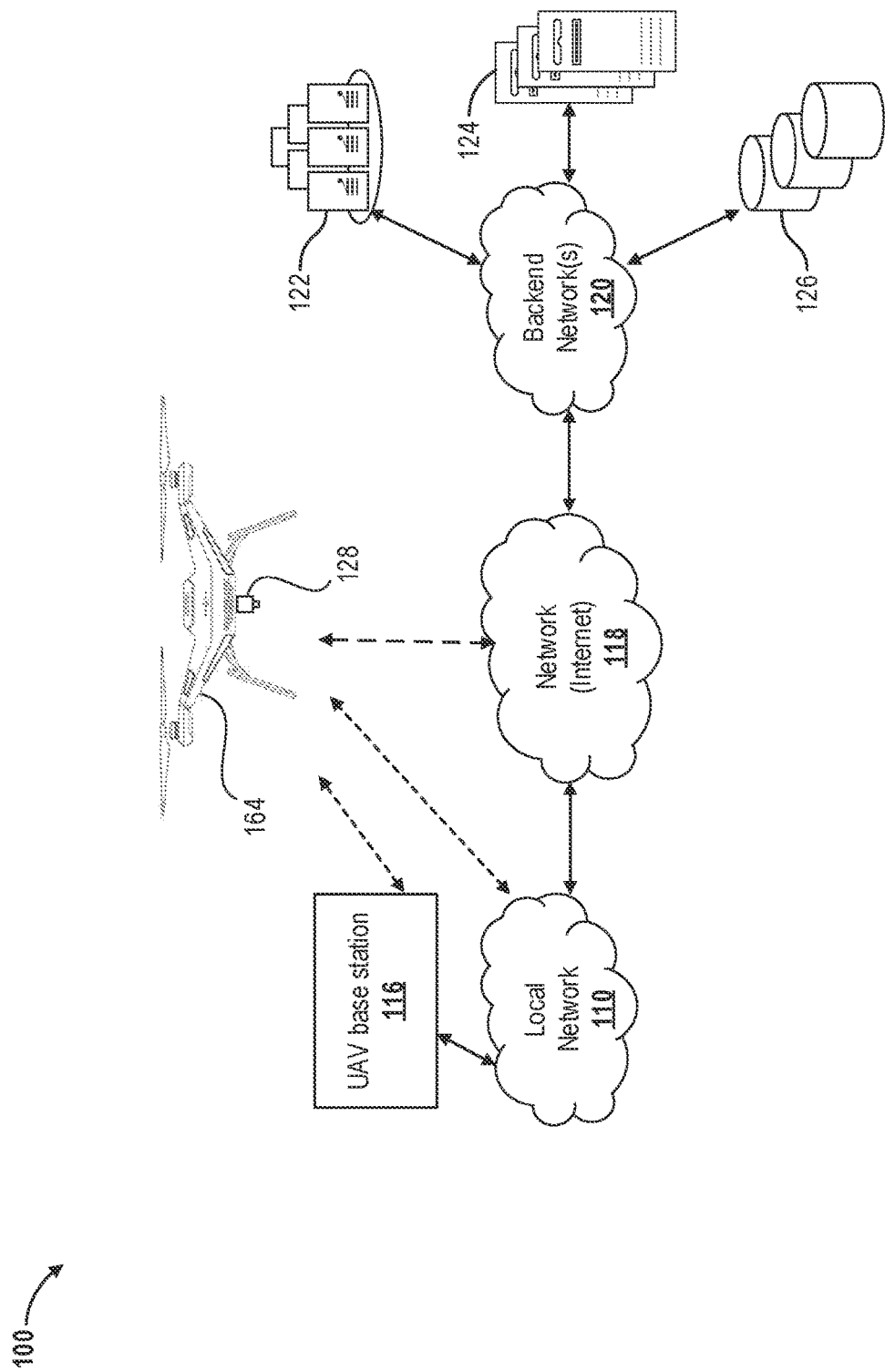
FIG. 1 is a schematic diagram illustrating an environment that includes a system for identifying antenna communication issues using UAVs according to various aspects of the present disclosure.

FIG. 1 is a schematic diagram illustrating an environment that includes a system 100 for identifying antenna communication issues using UAVs according to various aspects of the present disclosure.

In various example embodiments, a UAV 164 (also referred to as a drone) may be dispatched from a UAV base station 116 to a particular location to visually inspect an antenna to detect potential issues affecting wireless communication involving the antenna. In various example embodiments, the UAV may be dispatched or otherwise controlled, either partially or fully, by a remote controller device located at the base station 116 and/or by a computer system that is in operable communication with the UAV 164 and/or base station 116 via a backend network 120, network 118 (Internet) and/or a local network 110.

The system 100 may include multiple deployable UAVs, such as, for example, UAV 164. Although one such UAV 164 is shown in FIG. 1, various embodiments may include more of such devices. For example, there may be dozens or hundreds of such UAVs deployed in a large area from one or more base stations.

An example of such a UAV is referred to herein as UAV 164. The UAV 164 may comprise, for example, remotely controllable means of flight such as rotary or fixed wing means of flight, at least one processor, at least one memory, at least one camera 128 and/or other related components capable of recording video images and at least one transmitter and receiver housed in a protective housing that protects the UAV 164 while being flown or otherwise used in various environmental conditions. The UAV 164 may then be electronically dispatched to a location of an antenna, or otherwise activated, in response to the UAV 164 or other device shown in FIG. 1 in operable communication with the UAV 164, receiving an indication of a potential communication issue involving the antenna.

With further reference to FIG. 1, the UAV 164 and/or UAV base station 116 may communicate with an area's local network 110, which may be, for example, a wired and/or wireless network over which the UAV 164 and/or UAV base station 116 communicate with other devices and/or each other. In some embodiments, the local network 110 is a network whose operation is initiated by the UAV 164 and/or UAV base station 116. The area's local network 110 may be, for example, a wired and/or wireless network (e.g., long range, low power (LoRa) 2.4 GHz wireless network, Low-Power Wide-Area Network (LPWAN), Ethernet network, Wi-Fi network, ZigBee network, Z-Wave network, etc.). Alternatively, or in addition, the area's local network 110 may comprise various networks such as a cellular/mobile network, a public network, a low-bandwidth network, and/or any other appropriate network. When the area's local network 110 is wireless, or includes a wireless component, the local network 110 may in some embodiments be a Wi-Fi network compatible with the IEEE 802.11 standard and/or other wireless communication standard(s).

As shown in FIG. 1, the area's local network 110 may be connected to another network 118, which may comprise, for example, the Internet and/or a public switched telephone network (PSTN). As described below, the UAV base station 116 and the UAV 164 may communicate with a server 124 (e.g., a server of a service provider, dispatcher, customer service entity, image analysis service, and/or a third party) via the local network 110. The UAV base station 116 and/or UAV 164 may also, or instead, communicate directly with the server 124 via the network 118 and/or backend network(s) 120. In various embodiments, the UAV base station 116 may be or may include a remote control device to communicate with the UAV 164 directly using radio frequency (RF) communications using analog or digital signaling protocols or other wireless communication protocols (e.g., using one or more wireless technologies and/or protocols, such as LoRa, LPWAN, Bluetooth, Bluetooth LE, ZigBee, Z-Wave, etc.). The network 118 may be any wireless network, or a combination of a wired and wireless network, configured to operatively couple the above-mentioned modules, devices, and systems as shown in FIG. 1. In various example embodiments, the UAV base station 116 and/or UAV 164 may communicate with the backend systems on the backend network(s) 120, such as the server 124, via a cellular network, such as the network 118.

For example, the network 118 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a satellite network, a storage area network (SAN), a frame relay connection, an Advanced Intelligent Network (AIN) connection, a synchronous optical network (SONET) connection, a digital T1, T3, E1 or E3 line, a Digital Data Service (DDS) connection, an Ethernet connection, an ISDN (Integrated Services Digital Network) line, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GNSS, a global positioning system (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (FireWire) connection, Fiber Channel connection, IrDA (infrared) port, SCSI (Small Computer Systems Interface) connection, USB (Universal Serial Bus) connection, or other wired or wireless, digital or analog, interface or connection, mesh or Digi® networking.

The UAV 164 may communicate, via the local network 110 and/or the network 118 (Internet/PSTN), with a backend network(s) 120 of servers and/or backend devices, such as (but not limited to) one or more remote storage devices 126 (which may be referred to interchangeably as "cloud storage device(s)"), one or more backend servers 124, and/or one or more backend APIs 122. While FIG. 1 illustrates the storage device 126, the server 124, and the backend API 122 as components separate from the network 120, it is to be understood that the storage device 126, the server 124, and/or the backend API 122 may be considered to be components of the network 120, in an embodiment. In various embodiments, such devices may be those of a service provider (e.g., a satellite television service provider), cellular telecommunication or data service provider, or other wireless service provider, monitoring server, a centralized security system, and/or an emergency services system configured to dispatch or control the UAV 164 in response to an indication of a potential issue affecting wireless communication involving at least one antenna.

According to one or more aspects of the present embodiments, the UAV base station 116 and/or UAV 164 may dispatch the UAV 164 by a user receiving a message or signal via local network 110 and/or network 118 to fly the UAV 164 manually via a remote control device that is located at or comprises the UAV base station 116 in response to receiving an indication via local network 110 and/or network 118 of a potential issue affecting wireless communication involving at least one antenna. In some embodiments, UAV 164 may be flown by an automated or robotic system (e.g., using computer vision and/or GPS technology of the UAV 164) in response to an indication of a potential issue affecting wireless communication involving at least one antenna.

For example, the indication may be an electronic signal or message sent via local network 110 and/or network 118 that includes GPS coordinates of an antenna that may have a potential issue affecting wireless communication involving the antenna. In response to receiving this indication, the UAV 164 may automatically fly to the location indicated by the GPS coordinates (e.g., which may also be assisted by using robotic computer vision navigation), recognize the antenna at that location using automated image analysis and object detection, and then start capturing still or video imagery of the antenna in response to the recognition of the antenna. The UAV 164 may be automatically activated to start looking for debris, obstructions or other objects affecting line-of-sight signal reception by the antenna in response to arriving at the location of the antenna and/or detection of the antenna.

In some embodiments, the base station 116 and/or UAV 164 may have a power switch that turns on at least one component of the UAV 164 and/or UAV base station in response to an indication of a potential issue affecting wireless communication involving an antenna to enable the UAV 164 to begin flying to or arrive at the location of the antenna. The switch may also or instead turn on a system of the UAV 164 that enables the UAV 164 to send the communications regarding the antenna, the potential issue affecting wireless communication involving the antenna and/or the location of the UAV 164. In some embodiments, the UAV 164 may include one or more sensors (e.g., thermometer, barometer, wind speed detector, precipitation detector, humidity detector, etc.) that detect adverse weather conditions at the location of the antenna (high winds, snow, heavy rain, etc.) which may cause potential issues affecting wireless communication involving the antenna.

With further reference to FIG. 1, the system 100 may further comprise a backend API 122 including one or more components. A backend API (application programming interface) may comprise, run on, or be hosted on, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicates with one another using their public APIs. In some embodiments, the API backend may hold the bulk of the data associated with and/or identifying the antenna, location of the antenna, customer data, and/or data regarding the UAV base station 116 and/or UAV 164, and offer the management capabilities according to various permission levels of authorized users.

The backend API 122 illustrated in FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 122 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them. For example, the services may include those that power on, activate, deploy, dispatch, fly, configure, reset, register and or manage the UAV base station 116 and/or UAV 164 and/or information regarding the UAV base station 116 and/or UAV 164.

In some embodiments, the system 100 further includes the UAV base station 116 communicatively coupled to the area's local network 110. The UAV base station 116 may be capable of communicating directly (e.g., via Wi-Fi Direct, Bluetooth, ZigBee, etc.), and/or via the area's local network 110 (e.g., a LPWAN), with UAV 164 and other devices present within the area, and/or other devices across the network 118.

In some implementations, the UAV base station 116 is a "smart" hub capable of facilitating communication among two or more devices across a network. For example, the UAV base station 116 may relay information between the UAV 164 and the server 124, to facilitate bidirectional audio and/or video transmissions therebetween (e.g., establishing two-way audio and/or video communication between the UAV base station 116 and/or UAV 164 and the server 124). In some embodiments, the UAV base station 116 may be a component of a service provider (e.g., a satellite television service provider), cellular telecommunication or data service provider, or other wireless service provider, monitoring server, a centralized security system, and/or an emergency services system configured to dispatch or control the UAV 164 in response to an indication of a potential issue affecting wireless communication involving at least one antenna.

The UAV base station 116 may also provide device internetworking functionality, allowing one device to communicate with another device without a separate backend server or computing device. For instance, the UAV base station 116 and UAV 164 may communicate with other UAVs through the UAV base station 116. For example, a the UAV 164 or UAV base station 116 may, upon experiencing a triggering event such as receiving an indication of a potential issue affecting wireless communication involving at least one antenna, broadcast a message to the closest other UAV to the antenna in the area's local network 110, instructing those devices to carry out some action, such as to proceed to the location of the antenna. In this manner, device-to-device cooperation may be achieved, without requiring backend server interaction (although backend server communication may also occur).

In some embodiments, the UAV base station 116 may comprise part of a broader area or premises monitoring system. In such embodiments, the system 100 may further include one or more security sensors (not shown). The sensors may include, for example, one or more sensors (e.g., thermometer, barometer, wind speed detector, precipitation detector, humidity detector, etc.) that detect adverse weather conditions (high winds, snow, heavy rain, etc.) in a particular geographic area that includes one or more antennas, which may cause potential issues affecting wireless communication involving such the antennas. In such embodiments, the UAV base station 116 may further act as a control system for the sensors and may activate and deactivate the sensors, may send communications to the UAV base station 116 and/or UAV 164 responsive to data from the sensors causing UAV 164 to visually inspect such antennas, may output alerts to a monitoring service or monitoring center responsive to data from the sensors, and/or may trigger an alert responsive to data from the sensors. In various embodiments, the UAV base station 116 may be configured to alter a state of the system. For example, the UAV base station may be configured to alter the state of the system from a normal state, in which there has been no adverse weather detected, to an alert state, in which adverse weather has been detected and to dispatch the UAV 164 to visually inspect antennas in the area to detect and resolve potential issues due to the inclement (snow, fallen branches, etc.) affecting wireless communication involving such antennas. In some embodiments, such a signal in generated response to the sensor output may trigger a launching of the UAV 164 to fly to the location of the potentially affected antenna.

Figure 2:
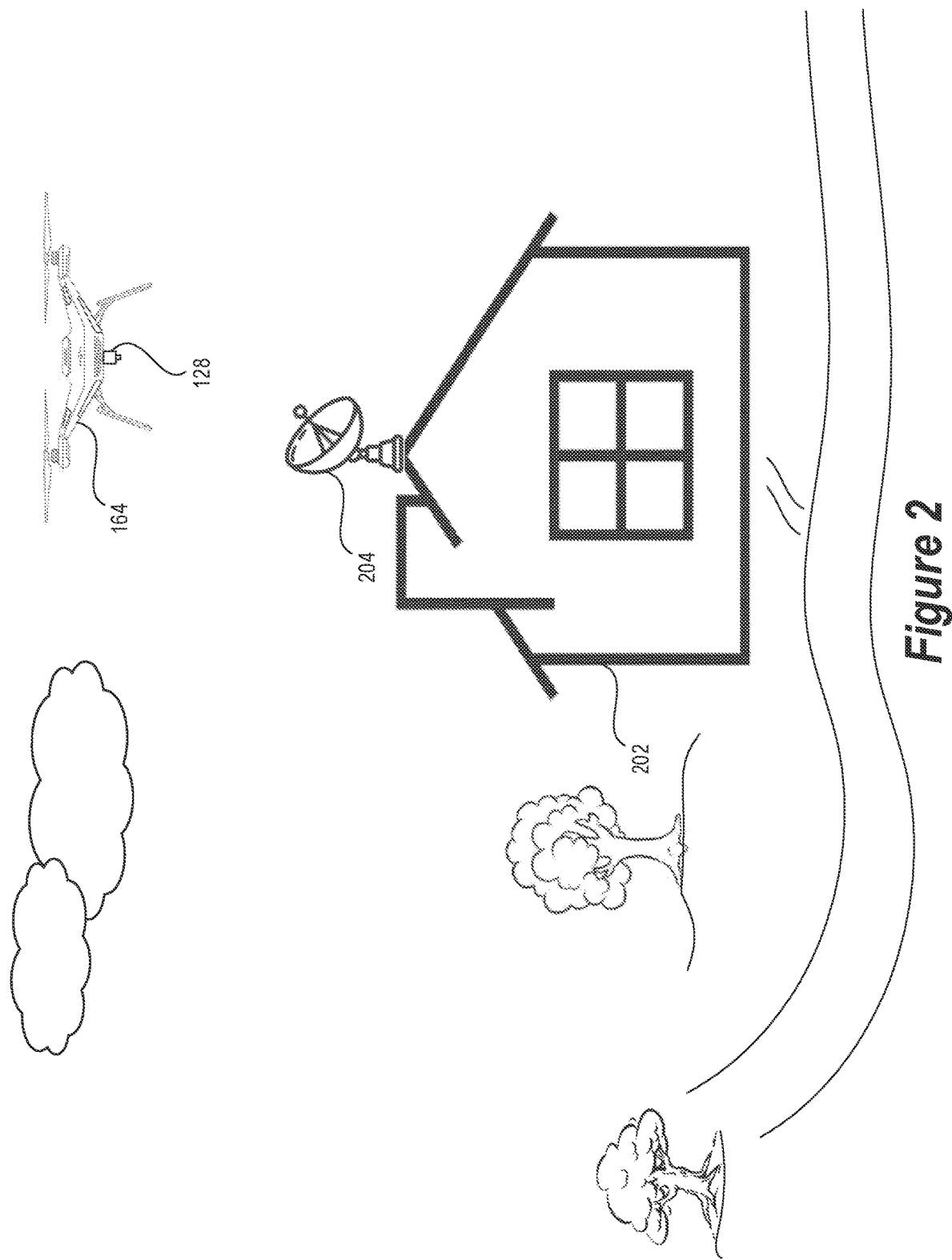
FIG. 2 is a diagram illustrating an example of how a UAV may be used to identify satellite antenna communication issues at a customer premises according to various aspects of the present disclosure.

FIG. 2 is a diagram illustrating an example of how a UAV may be used to identify satellite antenna communication issues at a customer premises according to various aspects of the present disclosure.

In an example embodiment, a wireless services provider, such as a satellite television services provider, may receive, (e.g., via backend network 120 of FIG. 1) a customer service call indicating an issue at a customer's premises 202 regarding a satellite television signal loss at the customer's premises 202. The satellite television services provider may then cause an electronic signal to be sent via backend network 120 to the UAV 164 and/or UAV base station 116 that causes the UAV 164 having a camera 128 to fly to the customer premises 202, or otherwise cause the UAV 164 to be dispatched to the customer premises 202, to visually inspect the satellite antenna 204. In some embodiments, the UAV 164 may comprise other related components capable of broadcasting, streaming, communicating, and/or recording audio and video. For example, the UAV 164 may broadcast streaming and/or recorded audio and video of the antenna 204 at the customer premises 202, which may show snow or other debris on the satellite antenna 204, or other obstruction(s) causing signal loss. Example components of the UAV 164 are shown and described in more detail with respect to FIG. 3.

Figure 3:
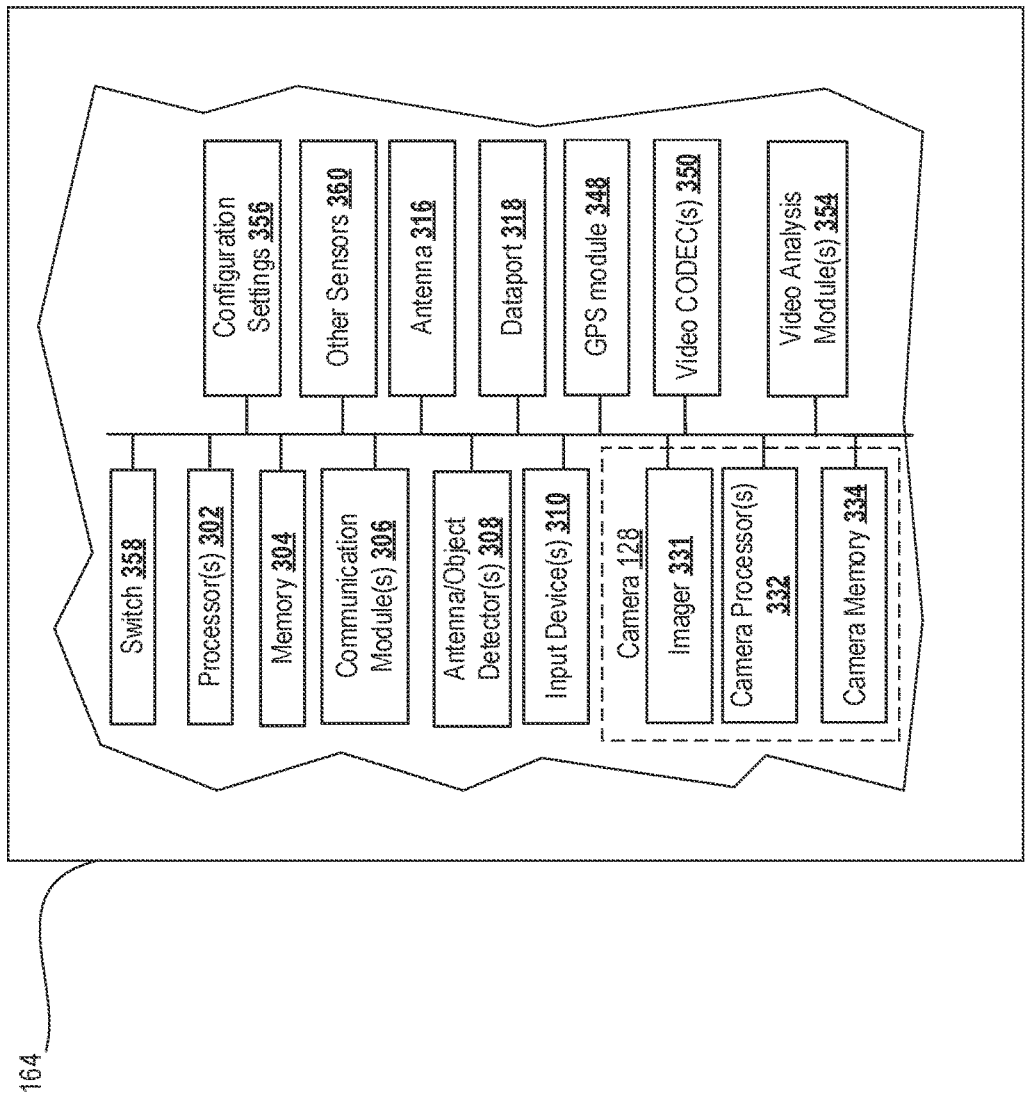
FIG. 3 is a cutaway view of a UAV showing a functional block diagram of components of an example UAV according to various aspects of the present disclosure.

FIG. 3 is a cutaway view of a UAV showing a functional block diagram of components of an example UAV according to various aspects of the present disclosure. The components of UAV 164 shown in FIG. 3 is an example of components of one UAV. However, the UAV 164 need not be the same type of UAV, or include all the same components and/or functionalities as that shown in FIG. 3.

The example UAV 164 may include, for example, one or more processor(s) 302, at least one memory 304, one or more communication module(s) 306, input device(s) 310, one or more camera(s) 128, one or more video CODEC(s) 350, a video analysis module(s) 354, an antenna 316, a dataport 318, a power source (not shown), an antenna/object detector 308, a GPS module 348, configuration settings 356, a switch 358 and other sensors 360 (e.g., such as the weather sensors described herein). In some embodiments, these components may be communicatively coupled together by an interconnect bus. The processor(s) 302 may include any processor such as those used in portable computing devices and/or smartphones, such as an ARM processor (a processor based on the RISC (reduced instruction set computer) architecture developed by Advanced RISC Machines (ARM)). In some embodiments, the processor(s) 302 may include one or more other processors, such as one or more microprocessors, and/or one or more supplementary co-processors, such as math co-processors. In various embodiments, additional or fewer components may be present. For example, in many embodiments, other he input devices, sensors and output devices may be present.

The memory 304 may include both operating memory, such as random access memory (RAM), as well as data storage, such as read-only memory (ROM), hard drives, flash memory, or any other suitable memory/storage element. The memory 304 may include removable memory elements, such as a CompactFlash card, a MultiMediaCard (MMC), and/or a Secure Digital (SD) card. In some embodiments, the memory 304 may comprise a combination of magnetic, optical, and/or semiconductor memory, and may include, for example, RAM, ROM, flash drive, and/or a hard disk or drive. The processor(s) 302 and the memory 304 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor(s) 302 may be connected to the memory 304 via the dataport 318.

The communication module(s) 306 are configured to handle communication links between the UAV 164 and other, external devices or receivers, and to route incoming/outgoing data appropriately. For example, inbound data from the dataport 318 may be routed through the communication module(s) 306 before being directed to the processor(s) 302, and outbound data from the processor(s) 302 may be routed through the communication module(s) 306 before being directed to the dataport 318. The communication module(s) 306 may include one or more transceiver modules capable of transmitting and receiving data, and using, for example, one or more protocols and/or technologies as described herein, such as, but not limited to, technologies regarding RF controls, GSM, UMTS (3GSM), IS-95 (CDMA one), IS-2000 (CDMA 2000), LTE, FDMA, TDMA, W-CDMA, CDMA, OFDMA, Wi-Fi, WiMAX, LPWAN, LoRa 2.4 GHz wireless network, or any other protocol and/or technology.

The dataport 318 may be any type of connector used for physically interfacing with a computer, smartphone and/or a portable computing device, such as a mini-USB or USB-C port. In other embodiments, the dataport 318 may include multiple communication channels for simultaneous communication with, for example, other processors, servers, and/or client terminals.

The memory 304 may store instructions for communicating with other systems, such as a computer. The memory 304 may store, for example, a program (e.g., computer program code) adapted to direct the processor(s) 302 in accordance with the present embodiments. The instructions also may include program elements, such as an operating system. While execution of sequences of instructions in the program causes the processor(s) 302 to perform the process steps described herein, hard-wired circuitry may be used in place of, or in combination with, software/firmware instructions for implementation of the processes of the present embodiments. Thus, the present embodiments are not limited to any specific combination of hardware and software.

The input device(s) 310 may include any combination of hardware and/or software elements that receive user input and/or facilitate the interpretation of received input. The input device(s) 310 may be hardware (e.g., physical buttons and switches), software (e.g., virtual buttons, sliders, etc.), or some combination thereof (e.g., software-controlled haptic feedback for simulating button clicks). In some instances, the input device(s) 310 includes a touchscreen or touch-based digitizer. The input device(s) 310 may include a virtual keyboard or other virtual input elements as well. In some embodiments, such physical input device(s) 310 may be accessible from outside the protective housing of the UAV 164, but recessed below the exterior surface of the housing, so as to protect the physical input device(s) 310 while the UAV 164 is being flown.

The camera 128 may comprise, for example, a high definition (HD) video camera, such as one capable of capturing video images at an image display resolution of 720p, 1080p, 2120p or any other image display resolution. The camera memory 334 may comprise volatile memory that may be used when data is being buffered or encoded by the camera processor 332. For example, in certain embodiments the camera memory 334 may comprise synchronous dynamic random access memory (SD RAM).

The UAV 164 may further include one or more video CODEC(s) 350 and/or software instructions to leverage video CODEC(s) 350 for the purposes of compression and/or decompression of images and/or videos. In an example operation, an imager 331 captures light from a scene, which is then interpreted and processed by one or more camera processors 332 to convert captured light signals into raw image/video data. The camera processor(s) 332 and/or processor(s) 302 may then compress that raw image/video data using the one or more video CODEC(s) 350, to reduce the amount of data stored or transmitted by the UAV 164. Any combination of known video CODECs may be included within the video CODEC(s) 350. In some embodiments, the video CODEC(s) 350 alternatively or additionally includes special-purpose video CODEC(s).

The UAV 164 may include functionality for the local processing of information, without the need of a server or backend computing device. In some embodiments, the UAV 164 includes one or more video analysis module(s) 354, and configuration settings 356, among other special-purpose software units. Each of these modules may be stored as instructions and/or data on a memory device of the UAV 164, such as the memory 304, EEPROMs, and/or other non-volatile memory thereon. The specific configuration and software used to instantiate these modules may be modifiable and updateable (e.g., may be updated from a remote computing device, such as backend server 124 shown in FIGS. 1 and 5, over a network such as backend network(s) 120 shown in FIG. 1).

The video analysis module(s) 354 may be configured to analyze reconnaissance data (e.g., images and/or video data) captured by the camera 128 of the UAV 164 to identify the contents of images/video, classify portions of images/videos with some label, and/or otherwise derive information from images and/or video for subsequent use thereof. For example, video analysis module(s) 354 may be configured to analyze reconnaissance data to detect an antenna and objects that may cause signal loss involving the antenna (e.g., snow or other objects on the antenna, or other objects obstructing line-of-sight signal being received by the antenna). The video analysis module(s) 354 provide image and video analysis tools that enable the UAV 164 to perform local processing of captured images without the need for backend processing. Such "onboard" video processing may be preferred over backend processing in circumstances where transmission latency over a wide area network would substantially reduce the efficacy of a particular method. The video analysis module(s) 354 may generally perform computer vision operations to detect objects, 3D scenes, object shape and motion, such as to detect an antenna and various objects as described above, as well as to assist in automated flying and navigation to the location of the antenna. Such computer vision operations to detect objects, 3D scenes, object shape and motion, such as to detect and/or locate an antenna and/or other objects as described herein within a recorded frame or scene, may be based on receiving multiple video frames of the same scene at different angles from the UAV 164, and using geometric computer vision techniques to detect and/or locate the antenna and/or other objects as described herein within a recorded frame or scene.

In some cases, the video analysis module(s) 354 may include software libraries, circuits, CODECs, classifiers, filters, machine learning tools, and/or other modules that are commonly used in audio and/or video processing. In other cases, the audio analysis module(s) 352 and/or the video analysis module(s) 354 are software and/or hardware modules that carry out application-specific audio/video analyses. For example, a particular module may be a classifier that determines whether the reconnaissance data includes a video frame that includes an antenna, snow on the antenna, tree branches on or near the antenna, other debris on the antenna, etc. In some embodiments, the UAV 164 detects whether an object obstructs a line-of-sight path from a transmitter (e.g., a satellite) to the antenna by determining the position of the transmitter relative to the antenna (e.g., via 3D coordinates, triangulation or other positioning techniques) and flying to a location in the line-of-sight from the transmitter to the antenna and, using camera 128, determining whether there is a clear view of the antenna at the location of the UAV the in the line-of-sight from the transmitter to the antenna. This may be performed via the video analysis module(s) 354 performing image analysis to determine whether there is a clear view of the antenna at the location of the UAV 164 in the line-of-sight from the transmitter to the antenna. For example, if the image analysis indicates the image of the antenna in the reconnaissance data is obstructed by an object in the frame of the image by more than a threshold percentage of the total area of the antenna surface, then the UAV 164 may automatically determine that the obstruction is the cause of the signal loss at the customer premises.

The video analysis module(s) 354 may further include modules for compressing video data. For instance, a video clip may be compressed by reducing a video clip's resolution and/or its per-pixel bitrate (e.g., color depth). In other cases, a video clip might be compressed using "P-frame" or "delta-frame" techniques, in which only changes between successive video frames are encoded. Any type of audio/video compression techniques may be employed on the UAV 164 without departing from the scope of the present disclosure.

The video analysis module(s) 352 may also include one or more digital analysis modules. Such digital analysis modules may be implemented in digital electronic circuitry, and/or in firmware, software, and/or in combinations thereof. Features of the digital analysis modules may be implemented in a computer program product tangibly embodied in an information carrier, such as a machine-readable storage device, and/or in a propagated signal, for execution by a programmable processor. Operations of the digital analysis modules may be performed by a programmable processor executing a program of instructions to perform functions of the described implementations by operating on input data and generating output.

Such digital analysis modules may be implemented in one or more computer programs that are executable on a programmable system including at least one programmable processor coupled to receive data and/or instructions from, and to transmit data and/or instructions to, a data storage system, at least one input device, and at least one output device. The computer program in which the digital analysis modules may be implemented include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Such digital analysis modules—which might use known video and image analysis techniques and/or other image analysis techniques—may conduct object detection, computer vision, photogrammetry analysis, among other analyses. The antenna/object detector(s) 308 may use such analysis modules to automatically detect an antenna 204 at a customer premises 202, such as that shown in FIG. 2, or other location, and also detect objects or other obstructions in the line-of-sight of the antenna that may cause signal loss. The antenna/object detector(s) 308 may also use artificial intelligence (AI) and/or machine learning techniques and models to improve antenna and obstruction detection over time based on previous detections of such objects during AI training and/or based on feedback during implementation of the processes described herein. The antenna/object detector(s) 308 may also or instead be implemented in the server 124 shown in FIG. 1 of the service provider or third party.

The switch 358 may be a mechanical and/or electrical switch that activates and deactivates at least one component of the UAV 164. For example, the switch 358 may be a power switch that turns on and off at least one component of the UAV 164. In some embodiments, the switch 358 is a manual switch (such as, for example, a button switch, slider switch, rocker switch, toggle switch, touch screen switch or other virtual switch) accessible from outside the protective housing of the UAV 164, and turns on and off a system of the UAV 164. For example, the switch 358 may be turned on by a user before the user or automated system launches, flies or otherwise deploys the UAV 164. Once the switch is turned on, the UAV 164 may become operable to perform one or more of: flying to a location of one or more antennas and capturing reconnaissance data indicating there exists a specific issue affecting wireless communication involving the at least one antenna.

While not shown, the UAV 164 may also include other hardware and/or components, such as a gyroscope, other types of sensors, a button, etc. The UAV 164 may also include configuration setting(s) 356. In some embodiments, the configuration setting(s) 356 represent the "state" of the UAV 164. For example, the UAV 164 may be placed into a "standby mode" when it is activated by the switch 358. A configuration file, flag, or the like may be modified, which might affect some aspects of operation of the UAV 164. For instance, the UAV 164 in "standby mode" mode may have the camera 128 activated and/or capturing video data into a buffer, such as into camera memory 334 and/or memory 304. The UAV 164 being in "standby mode" mode may mean the UAV 164 is otherwise in an activated state ready to fly to a location of an antenna and/or send such recorded data and timestamp information to a remote system upon manual input or a triggering event, such as receiving an indication of a potential issue affecting wireless communication involving an antenna.

The configuration setting(s) 356 may also represent a particular configuration, parameters, weightings, or other settings of a quantitative model, classifier, machine learning algorithm, or the like. As one example, a support vector machine (SVM) may be represented as a hyperplane that divides two regions of vector space into two respective classifications. The coefficients defining the hyperplane may be included within the configuration setting(s) 356. As another example, an artificial neural network (ANN) may comprise a set of interconnected nodes, with specific weights between each node connection. These connection weights may also be included within the configuration setting(s) 356.

In some implementations, the UAV 164 includes a classifier or machine learning algorithm that is executed locally on the processor(s) 302. The parameters or weightings of the classifier or machine learning algorithm—that is, the configuration setting(s) 356—may be updated (e.g., received from a computing device via the communication module(s) 306). Thus, the configuration setting(s) 356 may include parameters, coefficients, or weightings that enable or improve the video analysis module(s) 354 to carry out particular tasks, as may be described in greater detail herein.

In some cases, various embodiments of the processor(s) 302 and/or the memory 304 may include thereon instructions that, upon execution, implement computer vision and/or image or video analysis functions. Alternatively, or additionally, the UAV 164 might include one or more integrated circuits in communication with the processor(s) 302 to carry out aspects of computer vision functions, such as object recognition, image or video compression, and/or face detection, among other functions.

The antenna 316 may enable the UAV 164 to communicate wirelessly. For instance, the antenna 316 may permit the UAV 164 to communicate over various RF frequency bands and/or cellular networks via one or more communication standards (e.g., GSM, CDMA, LTE, etc.). The antenna 316 may allow the UAV 164 to communicate over other wireless protocols, such as Wi-Fi, Bluetooth, LoRa 2.4 GHz wireless network protocols and LPWAN protocols, among other wireless protocols. The antenna 316 may include multiple antennae, depending on the particular implementation. In addition to the above, the UAV 164 may include a variety of other components, such as batteries, connectors, light indicators, cameras, and sensors, among other components.

Figure 4:
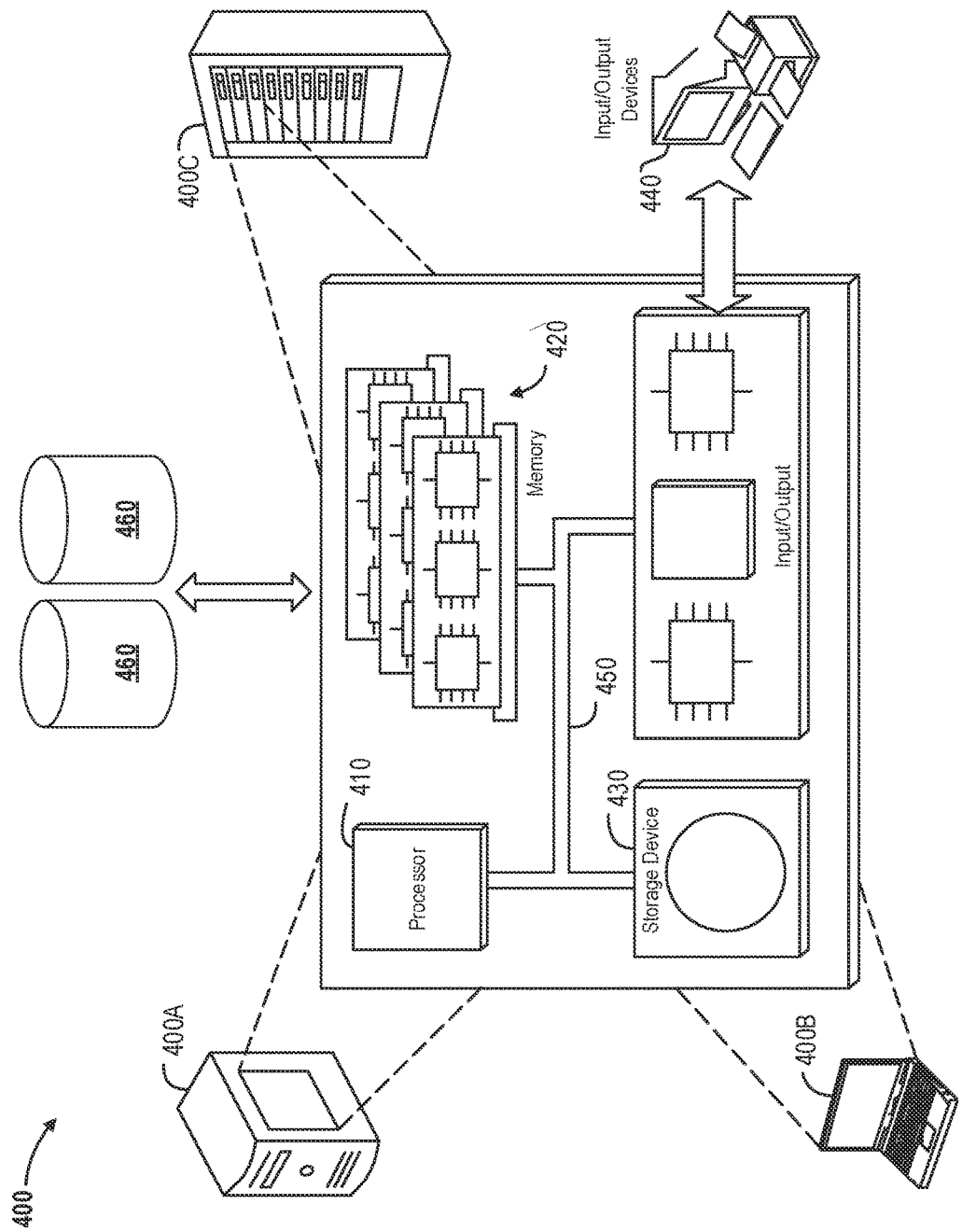
FIG. 4 is a functional block diagram of a general-purpose computing system on which the present embodiments may be implemented according to various aspects of the present disclosure.

FIG. 4 is a functional block diagram of a general-purpose computing system 400 on which the present embodiments may be implemented according to various aspects of the present disclosure.

One or more operations for identifying antenna communication issues using UAVs may be performed by a server or backend system, such as the server 124 via the backend API 122 of FIG. 1, for example. Alternatively, or additionally, one or more operations for identifying antenna communication issues using UAVs may be performed by another computing device or system, such as the UAV 164 and/or the UAV base station 116, for example. In various embodiments, the computer systems of the UAV 164, the UAV base station 116, server 124 and/or the backend API 122 of FIG. 1 may comprise some or all the components of the computer system 400. The computer system 400 may be embodied in at least one of a personal computer (also referred to as a desktop computer) 400a, a portable computer (also referred to as a laptop or notebook computer) 400b, and/or a server 400c. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 400 may execute at least some of the operations described above. The computer system 400 may include at least one processor 410, memory 420, at least one storage device 430, and input/output (I/O) devices 440. Some or all of the components 410, 420, 430, 440 may be interconnected via a system bus 450. The processor 410 may be single- or multi-threaded and may have one or more cores. The processor 410 may execute instructions, such as those stored in the memory 420 and/or in the storage device 430. Information may be received and output using one or more I/O devices 440.

The memory 420 may store information, and may be a computer-readable medium, such as volatile or non-volatile memory. The storage device(s) 430 may provide storage for the computer system 400, and may be a computer-readable medium. In various aspects, the storage device(s) 430 may be a flash memory device, a hard disk device, an optical disk device, or any other type of storage device.

The I/O devices 440 may provide input/output operations for the system 400. The I/O devices 440 may include a keyboard, a pointing device, and/or a microphone. The I/O devices 440 may further include a display unit for displaying graphical user interfaces, a speaker, and/or a printer. External data may be stored in one or more accessible external databases 460.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method acts or operations may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special-purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including, for example, semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a backend component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

Figure 5:
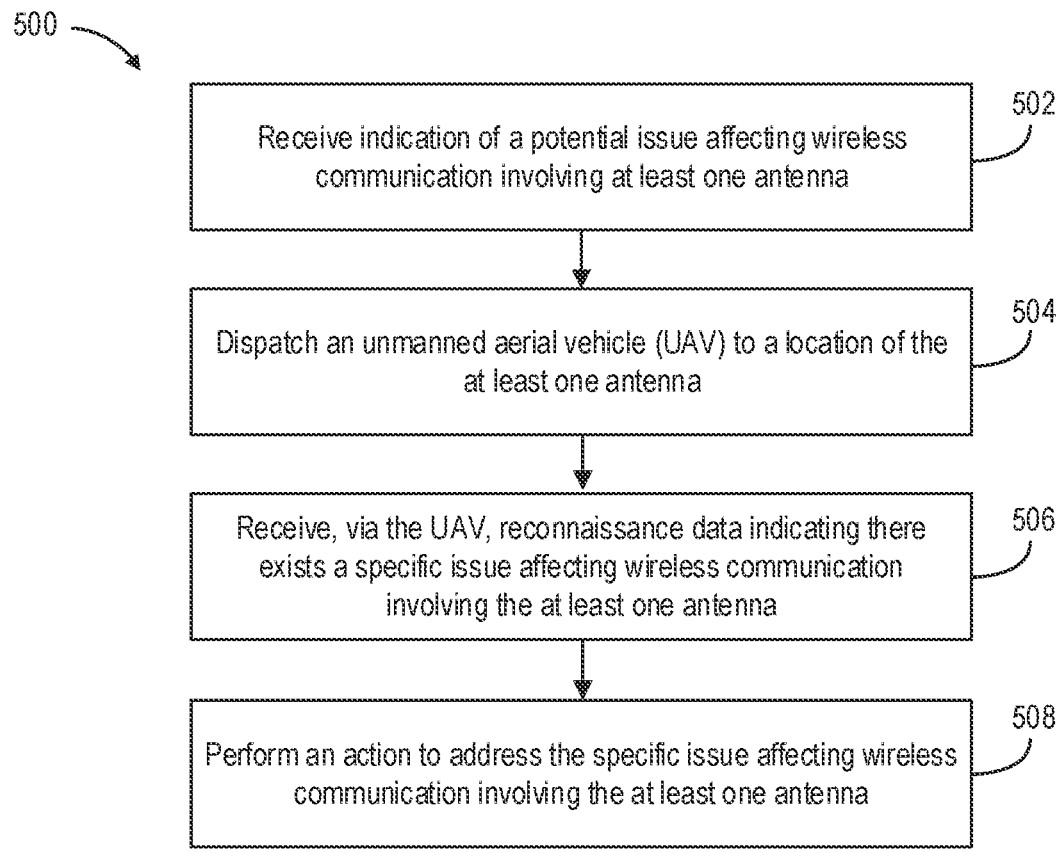
FIG. 5 is a flow chart illustrating an example method for identifying antenna communication issues, according to various aspects of the present disclosure.

FIG. 5 is a flow chart illustrating an example method 500 for identifying antenna communication issues, according to various aspects of the present disclosure.

At 502, a system 100 for identifying antenna communication issues receives an indication of a potential issue affecting wireless communication involving at least one antenna. In an example embodiment, the antenna is a satellite dish that receives satellite signal from a satellite At 504, the system 100, in response to receiving the indication of the potential issue, electronically dispatches a UAV to a location of the at least one antenna. The system 100 may electronically control the UAV remotely to visually inspect the antenna via a camera of the UAV.

At 506, the system 100, receives, via the UAV, reconnaissance data indicating there exists a specific issue affecting wireless communication involving the at least one antenna. For example, the aerial imagery received via the UAV may indicate the specific issue affecting wireless communication involving the at least one antenna is a line-of-sight issue from the antenna to a transmission source, or may indicate the specific issue affecting wireless communication involving the at least one antenna is due to debris on the antenna.

At 508, the system 100, in response to receiving the reconnaissance data indicating there exists a specific issue affecting wireless communication involving the at least one antenna, performs an action to address the specific issue affecting wireless communication involving the at least one antenna.

Figure 6:
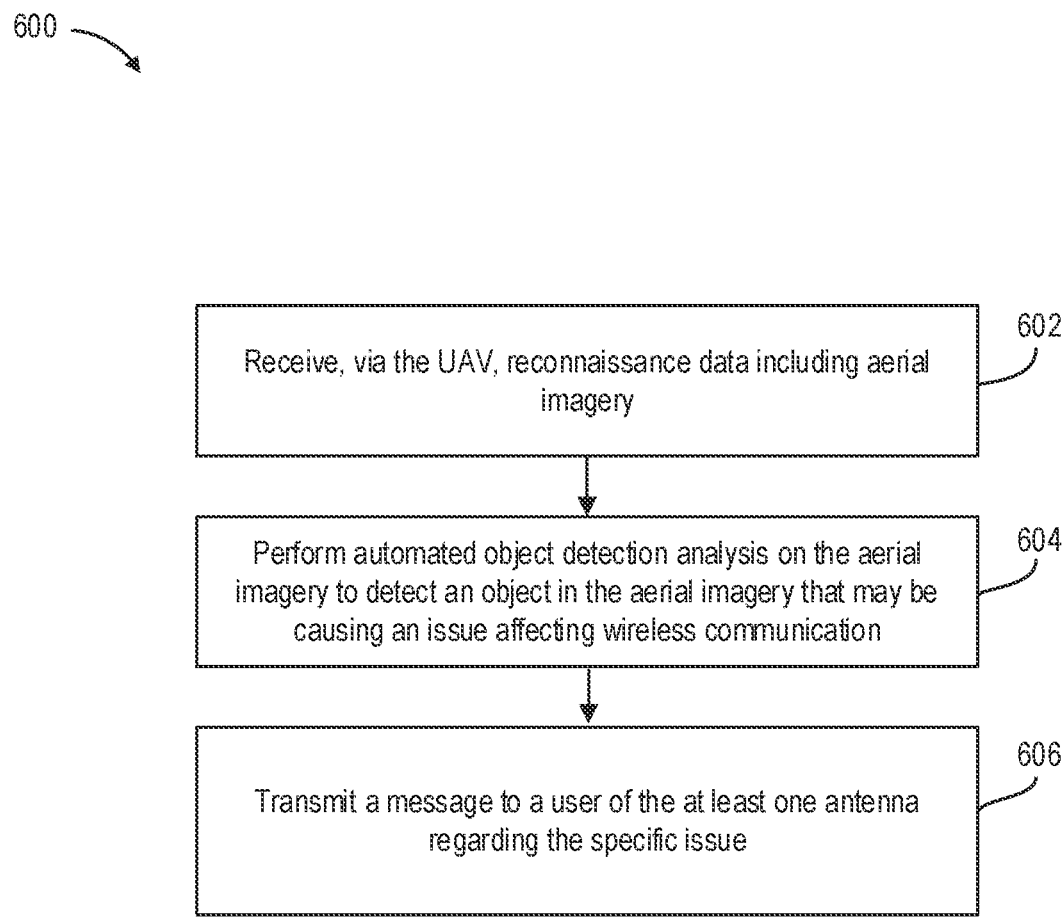
FIG. 6 is a flow chart illustrating an example method for identifying antenna communication issues involving automated object detection analysis on aerial imagery received from a UAV, according to various aspects of the present disclosure.

FIG. 6 is a flow chart illustrating an example method 600 for identifying antenna communication issues involving automated object detection analysis on aerial imagery received from a UAV, according to various aspects of the present disclosure.

At 602, a system 100 for identifying antenna communication issues receives reconnaissance including aerial imagery received via a UAV indicating there exists a specific issue affecting wireless communication involving the at least one antenna.

At 604, the system 100 performs automated object detection analysis on the aerial imagery received via the UAV to detect an object in the aerial imagery that may be causing the specific issue affecting wireless communication involving the at least one antenna.

At 606, the system 100 transmits a message to a user of the antenna regarding the specific issue. For example, the message may include instructions on how to address the issue, such as by removing snow or other debris form the antenna.

Figure 7:
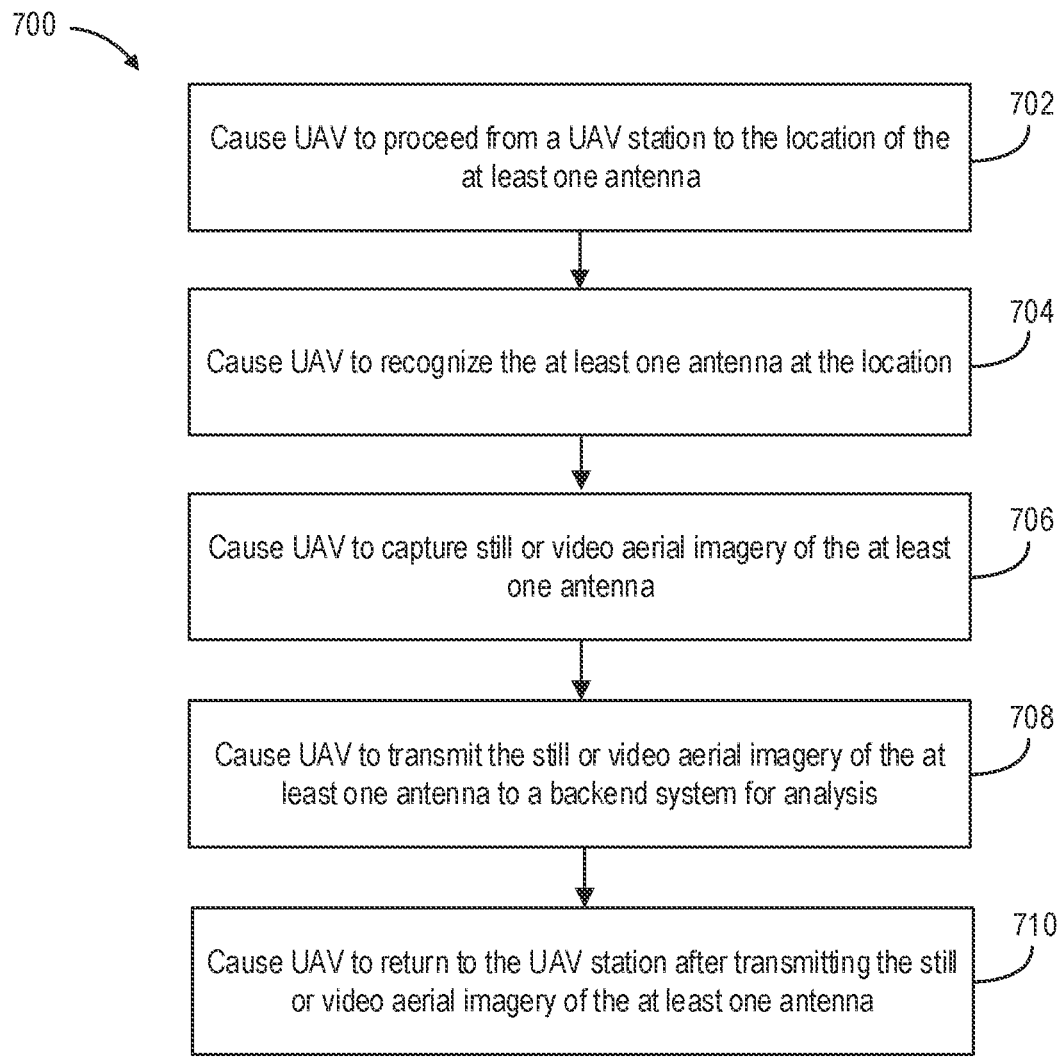
FIG. 7 is a flow chart illustrating an example method for identifying antenna communication issues by causing a UAV to fly to and recognize an antenna at a location and transmit still or video aerial imagery of the antenna for analysis, according to various aspects of the present disclosure.

FIG. 7 is a flow chart illustrating an example method 700 for identifying antenna communication issues by causing a UAV to fly to and recognize an antenna at a location and transmit still or video aerial imagery of the antenna for analysis, according to various aspects of the present disclosure.

At 702, a system 100 for identifying antenna communication issues electronically causes a UAV to automatically proceed from a UAV station to the location of at least one antenna in response to a signal electronically dispatching the UAV.

At 704, the system 100 electronically causes a UAV to automatically recognize at least one antenna at the location.

At 706, the system 100 electronically causes a UAV to automatically capture still or video aerial imagery of the at least one antenna in response to the recognition of the at least one antenna.

At 708, the system 100 electronically causes a UAV to automatically transmit the still or video aerial imagery of the at least one antenna to a backend system for analysis to determine there exists the specific issue affecting wireless communication involving the at least one antenna.

At 710, the system 100 electronically causes a UAV to automatically return to the UAV station after transmitting the still or video aerial imagery of the at least one antenna.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special-purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including, for example, semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for identifying antenna communication issues, the method comprising:
    receiving, by at least one processor of a system for identifying antenna communication issues, an indication of a potential issue affecting wireless communication involving at least one antenna;
    in response to receiving the indication of the potential issue, electronically dispatching an unmanned aerial vehicle (UAV) to a location of the at least one antenna;
    receiving, via the UAV, reconnaissance data indicating there exists a specific issue affecting wireless communication involving the at least one antenna; and
    in response to receiving the reconnaissance data indicating there exists a specific issue affecting wireless communication involving the at least one antenna, performing an action to address the specific issue affecting wireless communication involving the at least one antenna.

2. The method of claim 1, further comprising:
    electronically controlling the UAV remotely to visually inspect the at least one antenna via a camera of the UAV.

3. The method of claim 1, wherein the reconnaissance data indicating there exists a specific issue affecting wireless communication involving the at least one antenna includes aerial imagery received via the UAV.

4. The method of claim 3 wherein the aerial imagery received via the UAV indicates the specific issue affecting wireless communication involving the at least one antenna is a line-of-sight issue from the antenna to a transmission source.

5. The method of claim 3 wherein the aerial imagery received via the UAV indicates the specific issue affecting wireless communication involving the at least one antenna is due to debris on the antenna.

6. The method of claim 3, further comprising:
    performing, by at least one computer processor, automated object detection analysis on the aerial imagery received via the UAV to detect an object in the aerial imagery that may be causing the specific issue affecting wireless communication involving the at least one antenna.

7. The method of claim 1 wherein the at least one antenna is a satellite dish that receives satellite signal from a satellite.

8. The method of claim 1, further comprising:
    electronically causing the UAV to automatically:
        proceed from a UAV station to the location of the at least one antenna in response to a signal electronically dispatching the UAV;
        recognize the at least one antenna at the location;
        capture still or video aerial imagery of the at least one antenna in response to the recognition of the at least one antenna;
        transmit the still or video aerial imagery of the at least one antenna to a backend system for analysis to determine there exists the specific issue affecting wireless communication involving the at least one antenna; and
        return to the UAV station after transmitting the still or video aerial imagery of the at least one antenna.

9. The method of claim 1 wherein the performing the action to address the specific issue affecting wireless communication involving the at least one antenna includes transmitting a message to a user of the at least one antenna regarding the specific issue.

10. A system for identifying antenna communication issues, the system comprising:
    at least one computer processor;
    at least one memory coupled to the at least one processor, the at least one memory having computer-executable instructions stored thereon that, when executed by the at least one computer processor, cause operations to be performed including:
        receiving an indication of a potential issue affecting wireless communication involving at least one antenna;
        in response to receiving the indication of the potential issue, electronically dispatching an unmanned aerial vehicle (UAV) to a location of the at least one antenna;
        receiving, via the UAV, reconnaissance data indicating there exists a specific issue affecting wireless communication involving the at least one antenna; and
        in response to receiving the reconnaissance data indicating there exists a specific issue affecting wireless communication involving the at least one antenna, performing an action to address the specific issue affecting wireless communication involving the at least one antenna.

11. The system of claim 10, wherein the operations further include:
    electronically controlling the UAV remotely to visually inspect the at least one antenna via a camera of the UAV.

12. The system of claim 10, wherein the reconnaissance data indicating there exists a specific issue affecting wireless communication involving the at least one antenna includes aerial imagery received via the UAV.

13. The system of claim 12 wherein the aerial imagery received via the UAV indicates the specific issue affecting wireless communication involving the at least one antenna is a line-of-sight issue from the antenna to a transmission source.

14. The system of claim 12 wherein the aerial imagery received via the UAV indicates the specific issue affecting wireless communication involving the at least one antenna is due to debris on the antenna.

15. The system of claim 12, wherein the operations further include:
    performing automated object detection analysis on the aerial imagery received via the UAV to detect an object in the aerial imagery that may be causing the specific issue affecting wireless communication involving the at least one antenna.

16. The system of claim 10 wherein the at least one antenna is a satellite dish that receives satellite signal from a satellite.

17. The system of claim 10, wherein the operations further include:
electronically causing the UAV to automatically:
proceed from a UAV station to the location of the at least one antenna in response to a signal electronically dispatching the UAV;
recognize the at least one antenna at the location;
capture still or video aerial imagery of the at least one antenna in response to the recognition of the at least one antenna;
transmit the still or video aerial imagery of the at least one antenna to a backend system for analysis to determine there exists the specific issue affecting wireless communication involving the at least one antenna; and
return to the UAV station after transmitting the still or video aerial imagery of the at least one antenna.

18. The system of claim 10 wherein the performing the action to address the specific issue affecting wireless communication involving the at least one antenna includes transmitting a message to a user of the at least one antenna regarding the specific issue.

19. A non-transitory computer-readable storage medium having computer-executable instructions stored thereon that, when executed by at least one computer processor, cause operations to be performed including:
receiving an indication of a potential issue affecting wireless communication involving at least one antenna;
in response to receiving the indication of the potential issue, electronically dispatching an unmanned aerial vehicle (UAV) to a location of the at least one antenna;
receiving, via the UAV, reconnaissance data indicating there exists a specific issue affecting wireless communication involving the at least one antenna; and
in response to receiving the reconnaissance data indicating there exists a specific issue affecting wireless communication involving the at least one antenna, performing an action to address the specific issue affecting wireless communication involving the at least one antenna.

20. The non-transitory computer-readable storage medium of claim 19, wherein the operations further include:
electronically controlling the UAV remotely to visually inspect the at least one antenna via a camera of the UAV.

* * * * *